United States Patent [19]

Rademacher

[11] Patent Number: 5,748,142
[45] Date of Patent: May 5, 1998

[54] PULSE DOPPLER RADAR SYSTEM WHICH IDENTIFIES AND REMOVES ELECTROMAGNETIC INTERFERENCE

[75] Inventor: Paul E. Rademacher, Setauket, N.Y.

[73] Assignee: Northrop Grumman Corporation, Los Angeles, Calif.

[21] Appl. No.: 772,160

[22] Filed: Dec. 20, 1996

[51] Int. Cl.$^6$ .............................. G01S 7/292; G01S 13/53
[52] U.S. Cl. .................................. 342/159; 342/93
[58] Field of Search .............................. 342/110, 136, 342/137, 159, 160, 162, 203, 93, 94

[56] References Cited

U.S. PATENT DOCUMENTS

| | | | |
|---|---|---|---|
| 4,635,060 | 1/1987 | Mertens | 342/194 |
| 5,184,137 | 2/1993 | Pozgay | 342/174 |
| 5,646,623 | 7/1997 | Walters et al. | 342/129 |

Primary Examiner—John B. Sotomayor
Attorney, Agent, or Firm—Walter G. Sutcliff

[57] ABSTRACT

A radar system for identifying an object of interest. A transmitter produces a first signal and a duplexer receives the first signal from the transmitter. An antenna transmits the first signal into the atmosphere and receives a second signal reflected by objects present in the atmosphere. A receiver samples the second signal and develops a third signal. A clutter filter removes a clutter component from the third signal at all frequencies and develops a fourth signal which is free from clutter. An electromagnetic interference (EMI) detection unit identifies EMI present in the fourth signal produced and develops a fifth signal which is free from EMI. A logic device compares the fourth and fifth signals to produce a sixth signal which is free from both clutter and EMI and represents only objects of interest. A display unit receives and displays the sixth signal to allow an operator to track objects of interest.

6 Claims, 9 Drawing Sheets

PULSE DOPPLER RADAR SYSTEM WHICH IDENTIFIES AND REMOVES ELECTROMAGNETIC INTERFERENCE

FIELD OF THE INVENTION

The present invention relates to a pulse doppler radar system and more particularly to a pulse doppler radar system which identifies and removes ElectroMagnetic Interference (EMI).

BACKGROUND OF THE INVENTION

Figure 1:
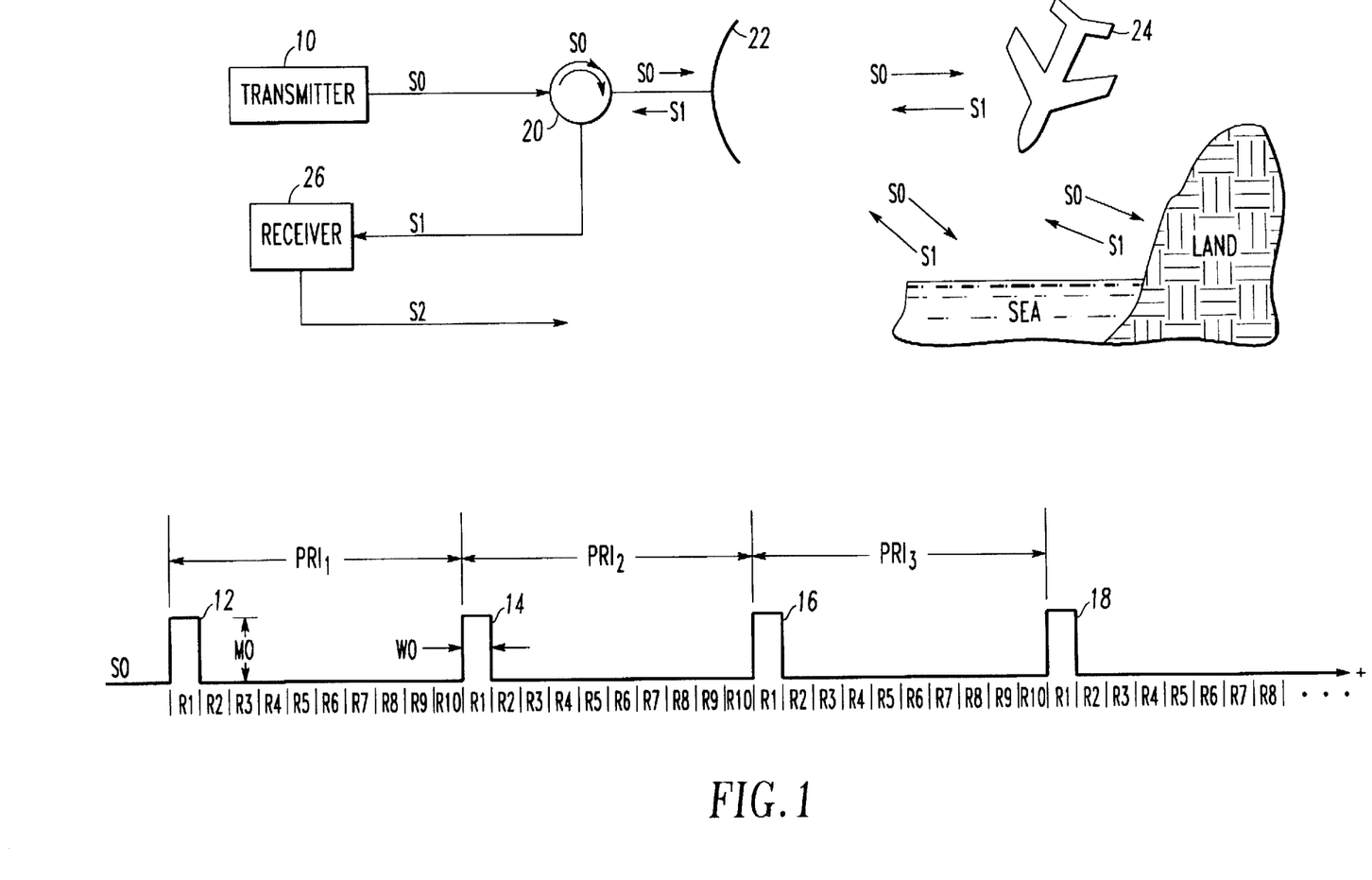
FIG. 1 illustrates a conventional radar system.

FIG. 1 shows a conventional pulse doppler radar system in which the location and speed of an object 24, such as an aircraft, can be determined. Referring to FIG. 1, a transmitter 10 produces a signal S0 which includes a batch of pulses 12, 14, 16 and 18. Each pulse 12–18 has a width W0, a magnitude M0, a phase $\phi_0$, and is separated by a pulse repetition interval (PRI). Each PRI contains a number of range cells which have been designated as R1–R10.

The signal S0 produced by the transmitter 10 enters a duplexer 20 which routes the signal S0 to an antenna 22. The antenna 22 radiates the signal S0 into space toward the object 24. When the signal S0 contacts the object 24, it is reflected back to the antenna 22, as a signal S1, and forwarded through the duplexer 20 to a receiver 26. The receiver 26 converts the signal S1 to a lower frequency, samples the signal at each range cell R1–R10 in each PRI, and digitizes each sample to develop a signal S2.

Figure 2:
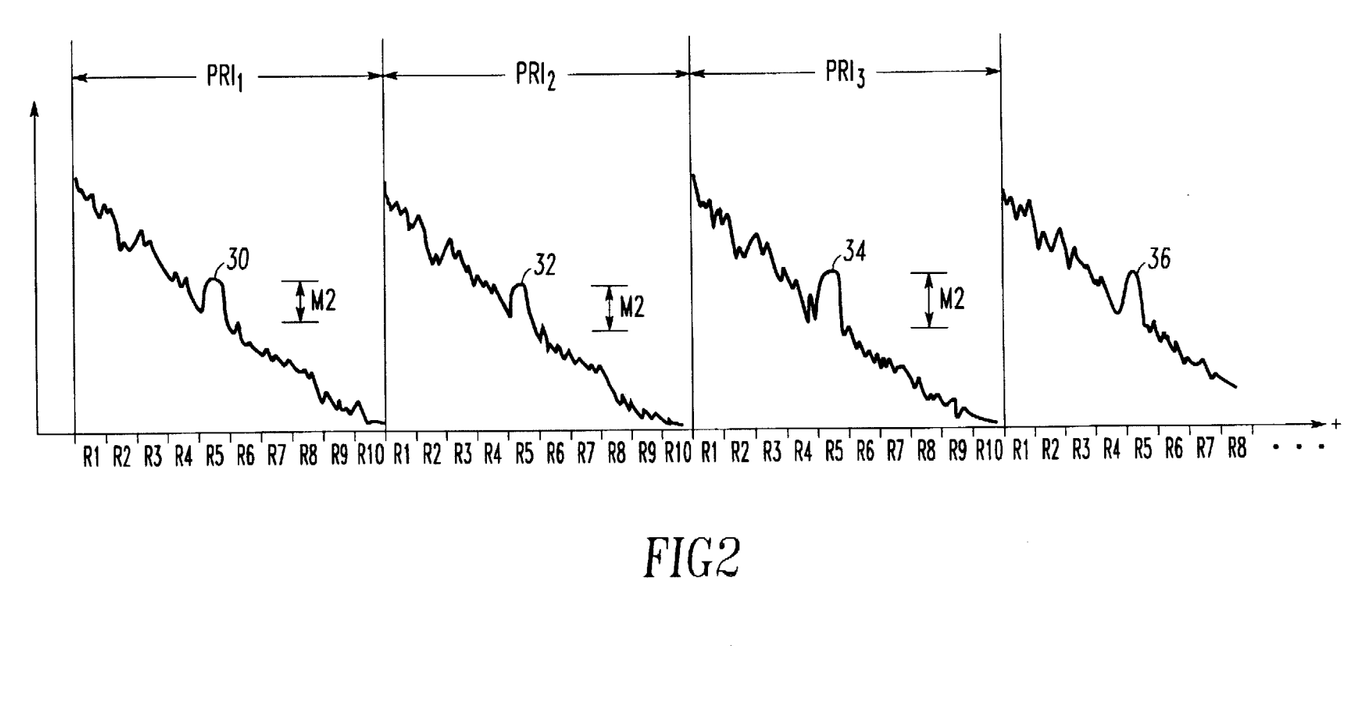
FIG. 2 illustrates a signal S2 produced by the conventional radar system shown in FIG. 1.

The signal S2, which is shown in FIG. 2, includes echos 30, 32, 34 and 36. These echos indicate the presence of the object 24. The arrival time and phase $\phi_2$ of each echo 30–36 is compared to the transmission time and phase $\phi_0$ of each pulse 12–18 of signal S0 to calculate the range and speed of the object 24.

The signal S2 produced by the receiver 26 includes other information as well. In particular, the signal S2 includes unwanted echos known as clutter and ElectroMagentic Interference (EMI). Clutter is present in the signal S2 as a result of the signal S1 being reflected from objects such as the sea, land, rain or chaff. EMI is present in the signal S2 as a result of pulses transmitted from other radar systems.

The clutter and EMI contained within the signal S2 produce undesirable results. In particular, peaks in the signal S2, which represents clutter or EMI, are many times mistakenly identified as an object of interest. This results in an undesirably high number of false alarms.

Figure 3:
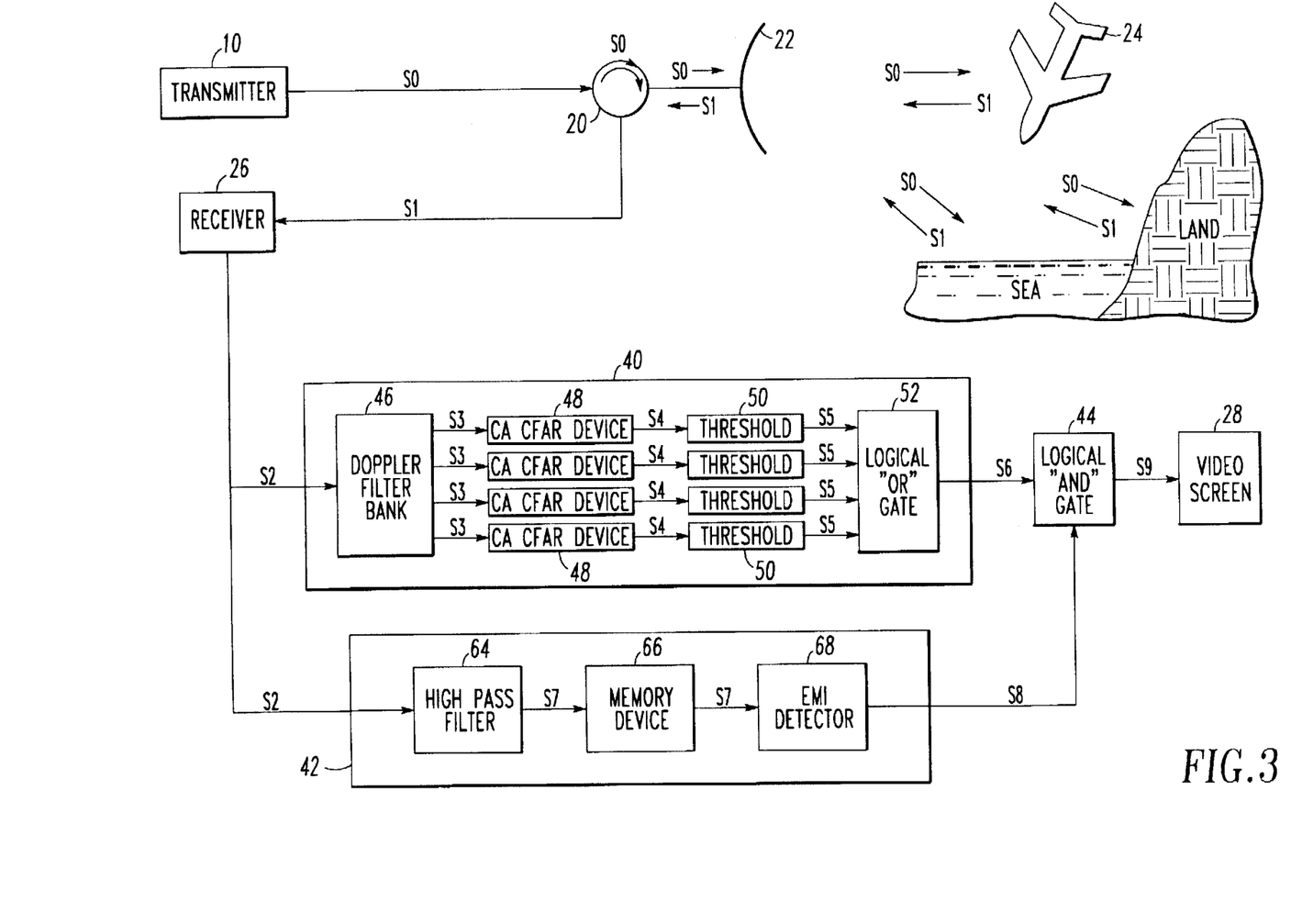
FIG. 3 illustrates another conventional radar system.

Conventional radar systems have addressed this problem by attempting to filter the clutter and EMI components from the signal S2. In particular, FIG. 3 shows a conventional radar system which includes a clutter filter 40, an EMI detection unit 42, and a logical AND gate 44.

The clutter filter 40 includes a Doppler Filter Bank (DFB) 46, a plurality of cell averaging (CA) constant false alarm rate (CFAR) devices 48, a plurality of threshold devices 50, and a logical OR gate 52. As is described below, these devices work in combination to filter the clutter component from the signal S2.

Figure 4:
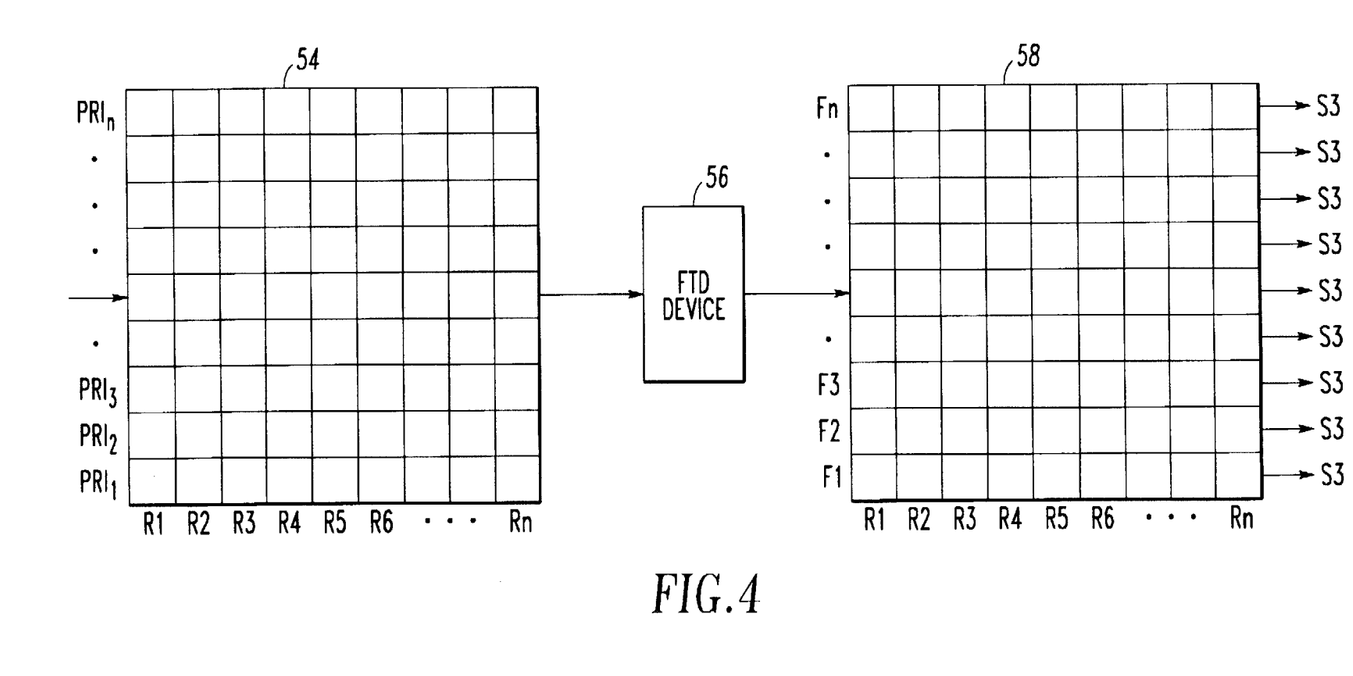
FIG. 4 illustrates a Doppler Filter Bank 46 shown in FIG. 3.

The DFB 46 contained within the clutter filter 40, which is shown in FIG. 4, includes a first memory device 54, a Fourier Transform Device (FTD) 56, and a second memory device 58. The first memory device 54 is an array which stores the magnitude M2 and phase shift $\phi_2$ for range cells R1–R10 at each PRI of the signal S2 shown in FIG. 2.

Once this data is stored in the first memory device 54, it is transformed from the time domain to the frequency domain by the FTD 56. In particular, the data in range cells R1 through Rn (i.e, column 1, column 2, etc) is transformed to the frequency domain, as is know in the art, by the FTD 56. The results are then stored in the second memory device 58.

The data stored in each row the of second memory device 58 represents the magnitude M2 and phase $\phi_2$ of each range cell operating at a certain frequency. That is, row 1 of the second memory device 58 represents the magnitude and phase of the signal S2 at frequency F1 for each range cell. Similarly, row 2 represents the magnitude and phase of the signal S2 at frequency F2 for each range cell.

Figure 5:
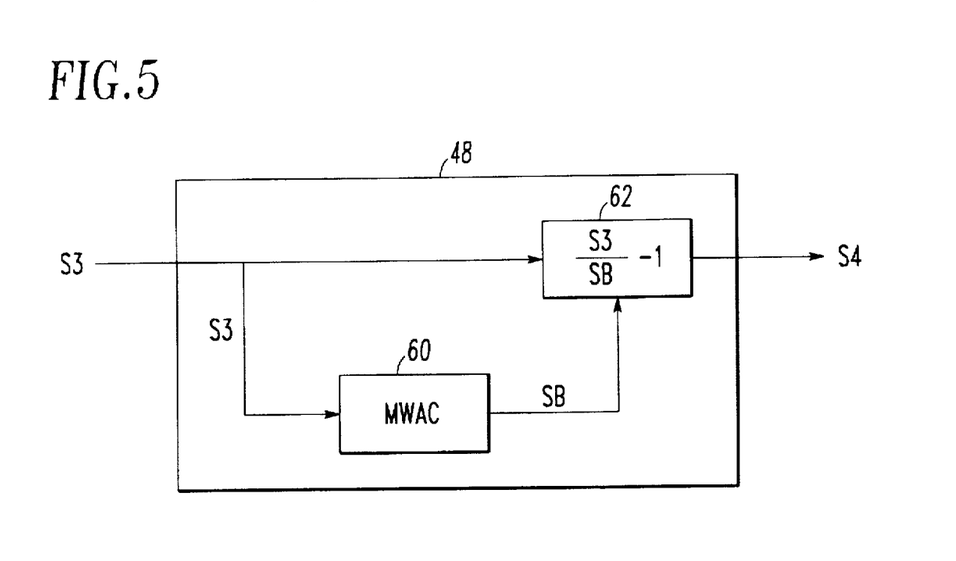
FIG. 5 illustrates a CA CFAR Device 48 shown in FIG. 3.

The data stored in each row of the second memory device 58, referring again to FIG. 3, is then sent to CA CFAR normalization devices 48. The CA CFAR devices 48, as is known in the art, normalize the signals S3 for each range cell R1–R10 at each frequency F1–Fn. Specifically, as shown in FIG. 5, each CA CFAR device 48 includes a Moving Window Average Calculator (MWAC) 60 and a normalizer 62. The MWAC 60 computes a Moving Window Average (MWA) for each range cell of the signal S3, where the MWA represents either an arithmetic average or a logarithmic average. The calculated MWA, which is shown as SB, as is known in the art, represents the average background of the local range about each range cell in the signal S3.

The value of the signal SB is used to normalize the value of each range cell stored in the second memory device 58. That is, the normalizer 62 divides the value stored in the second memory device 58 for each range cell by the value SB calculated for each range cell and then subtracts a factor of 1 from this value to produce a signal S4. The subtraction of the factor 1 by the normalizer 62 is, however, optional.

Again, referring to FIG. 3, the values for each range cell contained within the signal S4 are then compared to a threshold value by a threshold device 50. If the value of each range cell contained in the signal S4 is greater than the threshold value, a factor of 1 is selected. On the other hand, if the value of the signal S4 is less than the threshold value, a factor of 0 is selected.

Figure 6:
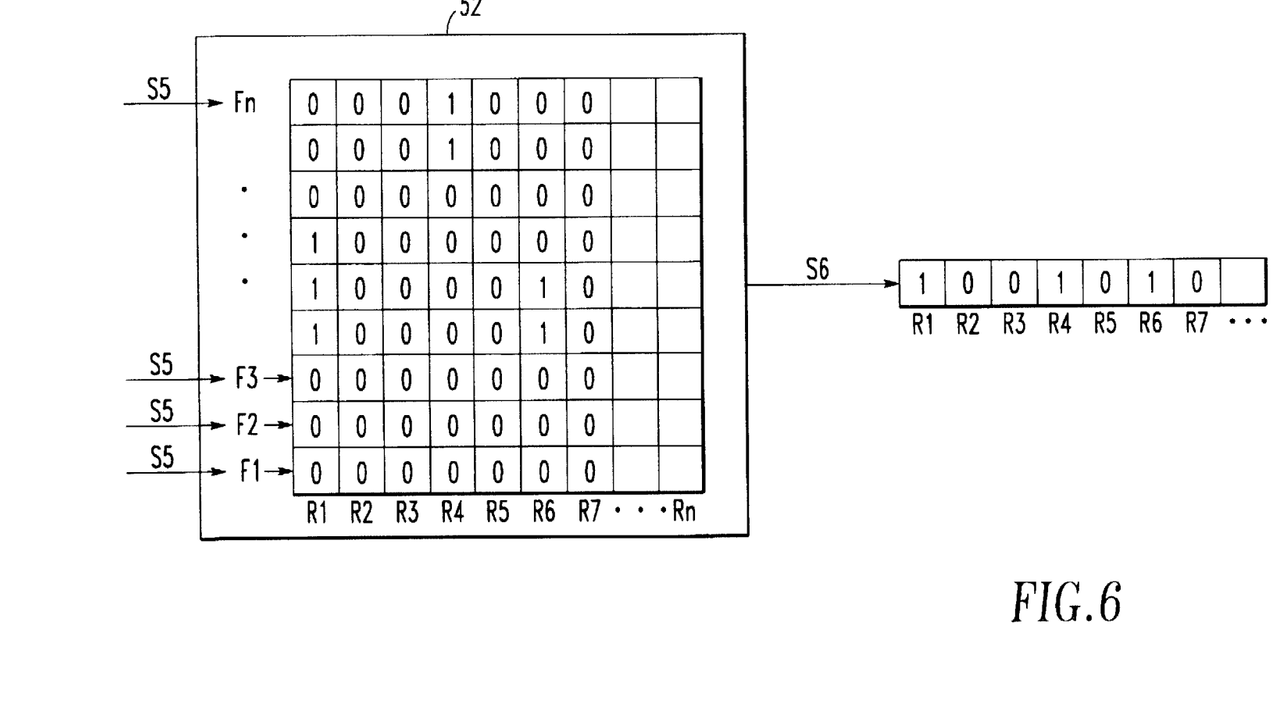
FIG. 6 illustrates Logical OR Gate 52 shown in FIG. 3.

These values, which are shown as signal S5, are then sent to logical OR gate 52. FIG. 6 shows a hypothetical set of values for the signal S5 which have been produced by the the threshold devices 50 and sent to the the logical OR gate 52. The logical OR gate 52 performs a binary OR operation on these values. Specifically, the binary values within each range cell (i.e., each column) of data are compared to each other by the logical OR gate 52. If any value is within the range cell is found to equal 1, the value for the entire range cell will be designated as a 1. Conversely, if any value is within the range cell is found to equal 0, the value for the entire range cell will be designated as a 0.

The results of this logical operation performed by the logical OR gate 52 are presented in signal S6. The signal S6 is essentially free of clutter and contains data which represents either a target or EMI. That is, each range cell in signal S6 which contains a 1 is considered to represent either a target or EMI.

The conventional radar system shown in FIG. 3 now must detect which range cells within the signal S6 represent EMI. The EMI detection unit 42 performs this detection task. Specifically, as is described below, the EMI detection unit 42 detects range cells representing EMI by use of a high pass filter 64, a memory device 66, and EMI detector 68.

The high pass filter 64, as is known in the art, is typically an n-pulsed canceler. Most of the clutter in the signal S2 is contained in the low frequency components of the signal. As a result, the high pass filter 64, which removes the low frequency components from the signal S2, removes most of the clutter. Thus, as a result of this filtering, the signal S7 produced by the high pass filter 64 represents either EMI or an object of interest.

Figure 7:
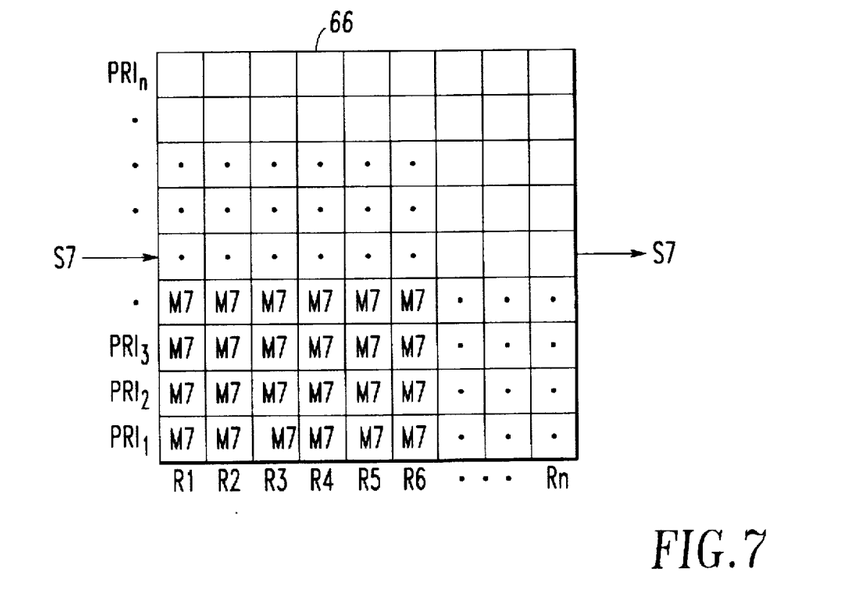
FIG. 7 illustrates Memory Device 66 shown in FIG. 3.

The signal S7, as shown in FIG. 7, is then sent to memory device 66. The data stored in the memory device 66 represents the magnitude M7 of each range cell in the signal S7.

The values of the signal S7 stored in each range cell (i.e., each column) of the memory device 66 are then analyzed by the EMI detector 68 to detect the presence of the EMI. In particular, the EMI detector 68 passes the data in each range cell through an algorithm to determine if the data in the range cell represents EMI or a target. The algorithm used by the EMI detector 68, as is generally known in the art, looks for one unusually large pulse in each range cell of the signal S7. If such a pulse is identified, the data in the range cell is considered to represent EMI. Conversely, if such a pulse is not identified, the data in the range cell is considered to represent an object of interest.

Figure 8:
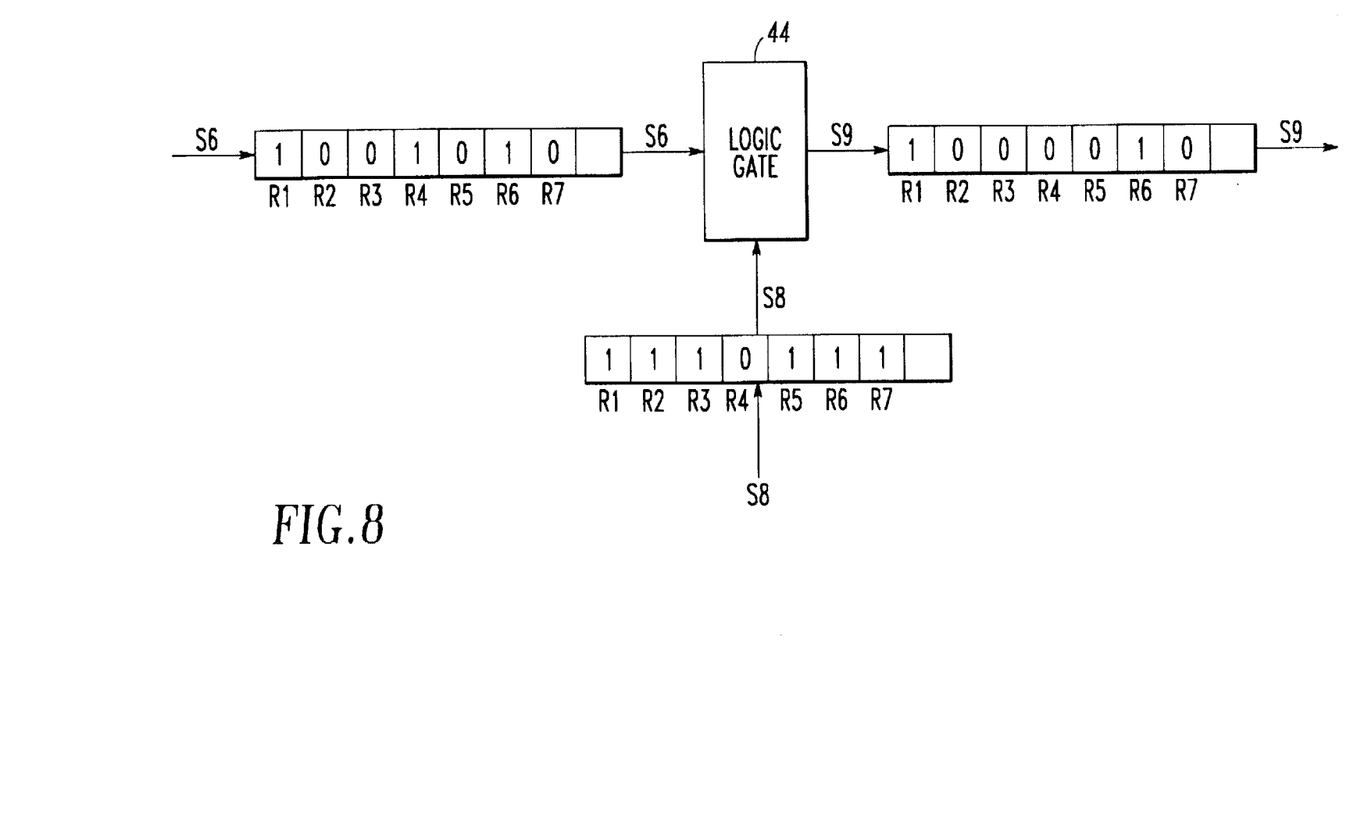
FIG. 8 illustrates Logical AND Gate 44 shown in FIG. 3.

The EMI detector 68 produces a signal S8 which is shown in FIG. 8. Each range cell in the signal S8 produced by the EMI detector 68 is assigned a value of 1 unless EMI had been detect in the range cell. If this is the case, the range cell is assigned a value of 0.

The signal S8 is then sent to the logical AND gate 44 along with signal S6. The logical AND gate 44 performs a binary AND operation on these two signals. That is, range cell R1 of signal S6 is compared with range cell R1 of signal S8 and when both values are found to equal 1 the value for the range cell R1 of signal S9 will be designated as 1.

Each range cell of the signal S9, at this juncture, will have been passed through both the clutter filter 40 and EMI detection unit 42. Thus, each range cell in the signal S9 containing a 1 is considered to represent a true object of interest. The signal S9 is then presented on the video screen 28 for review by a video operator.

The conventional radar system shown in FIG. 3 does, however, have certain drawbacks. In particular, the EMI detector 68 is only effective if the clutter echos contained in the signal S2 are sufficiently filtered prior to producing the signal S7. The high pass filter 64 used in conventional devices fails in this regard. Specifically, the high pass filter 64 used in conventional devices removes only the low frequency clutter components from the signal S2 prior to producing the signal S7. However, in many instances, the signal S7 contains significant residues from high frequency clutter echos. When this occurs, the EMI detector 68 can not effectively detect the EMI since the EMI is masked by the clutter residue. As a result, many EMI pulses remain undetected and an undesirably high number of false alarms are included in the signal S9.

OBJECTS AND SUMMARY OF THE INVENTION

It is therefore an object of this invention to provide a radar system which adaptively filters both the low frequency and high frequency clutter components from a signal received by the radar system prior to examining the signal for pulses produced by EMI.

In accordance with one aspect of the invention, a radar system for identifying an object of interest is provided. The radar system comprises (i) a transmitter means for producing a first signal, where the first signal includes a plurality of pulses separated by a pulse repetition interval (PRI) where each PRI contains a plurality of range cells; (ii) a duplexer means for receiving and processing the signals, where the duplexer means receives the first signal from the transmitter; (iii) an antenna which receives the first signal from the duplexer means and transmits the first signal into the atmosphere, receives a second signal reflected by objects present in the atmosphere, and routes the second signal to the duplexer; (iv) a receiving means which receives the second signal from the duplexer, samples the second signal at all range cells, and develops a third signal; (v) a clutter filtering means which filters a clutter component from the third signal at all frequencies and develops a fourth signal which is free from clutter; (vi) an electromagnetic interference (EMI) detection means which identifies EMI present in the fourth signal and develops a fifth signal which is free from EMI; (vii) a logic means which compares the fourth and fifth signals to produce a sixth signal which is free from both clutter and EMI; and (viii) a display means which receives and displays the sixth signal.

In accordance with another aspect of the invention, the EMI detection means further includes (i) an inverse Doppler filter bank and (ii) an EMI detector.

In accordance with yet another aspect of the invention, the EMI detector includes: (i) a means for examining a plurality of contiguous values contained within each range cell of the fourth signal (ii) a means for comparing the largest value found in each range cell to each remaining nonadjacent value in each range cell and calculating a factor, (iii) a means for assigning each range cell a value, where the assigned value is 1 when the factor is less than 2 and the assigned value is 0 when the factor is greater than 2.

BRIEF DESCRIPTION OF THE DRAWINGS

The accompanying drawings are included to provide an understanding of the invention and constitute a part of the specification.

DETAILED DESCRIPTION OF THE INVENTION

Figure 9:
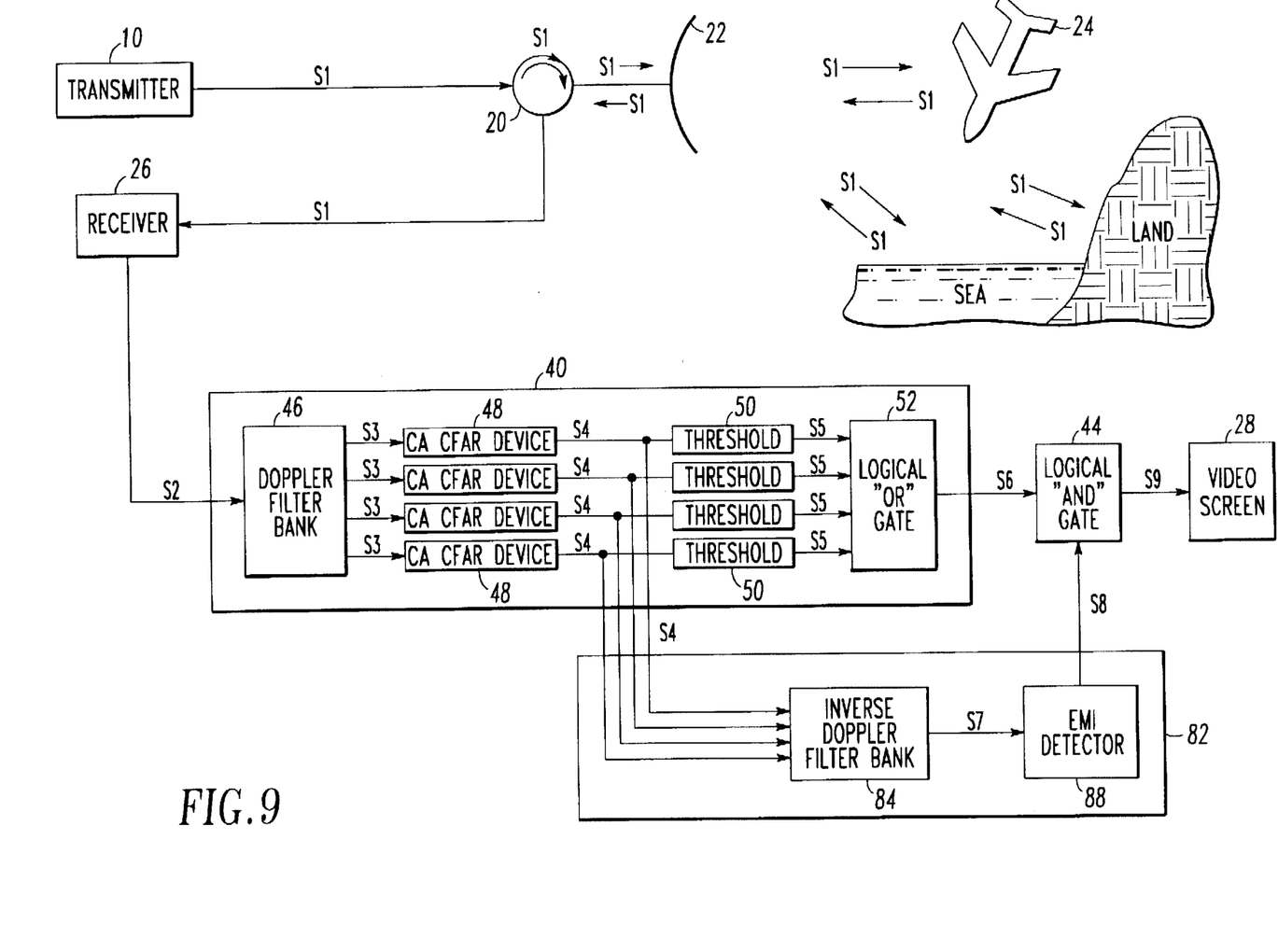
FIG. 9 illustrates a radar system in accordance with the present invention.

FIG. 9 shows a radar system in accordance with the present invention. Components which are identical to and function in the same way as those referred to in conventional devices, except where necessary, will not be described herein.

Figure 10:
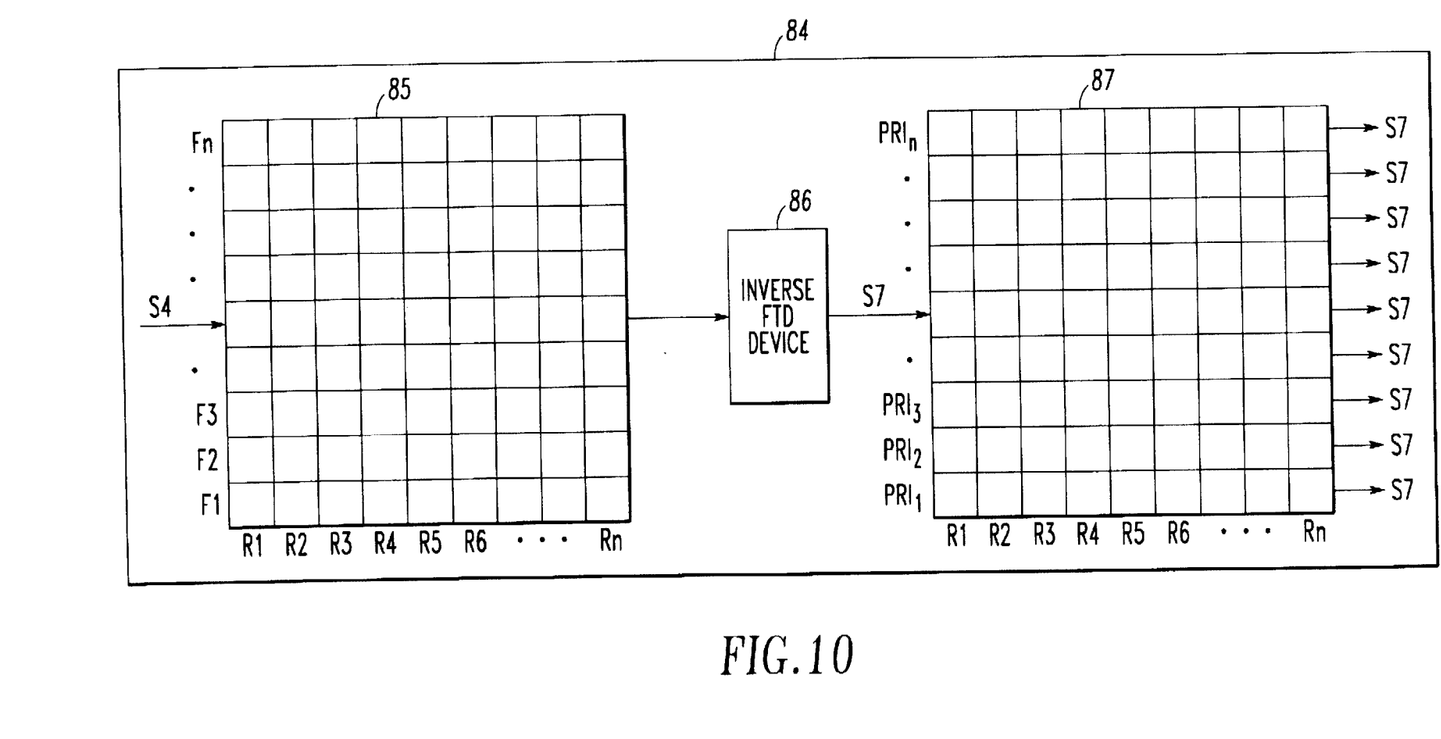
FIG. 10 illustrates an Inverse Doppler Filter Bank 84 shown in FIG. 9.

A radar system designed in accordance with the present invention includes an EMI detection unit 82 which contains an Inverse Doppler Filter Bank (DBF) 84 and an EMI detector 88. As shown in FIG. 10, the Inverse DFB 84 includes a first memory device 85, an Inverse Fourier Transform Device (FTD) 86, and second memory device 87. The first memory device 85 is an array which stores the magnitude and phase of the signal S4 at frequencies F1 through Fn for each range cell. Once the data is stored in the first memory device 85 it is transformed from the frequency domain back to the time domain, as is known in the art, by the inverse FTD 86. The results, which are shown as signal S7 are then stored in the second memory device 87.

The values of the signal S7 within each range cell (i.e., each column of data stored in the second memory device 87) are then analyzed by the EMI detector 68 in accordance with a newly developed algorithm to detect the echos resulting from EMI. Specifically, the algorithm used by the EMI detector 68 compares the amplitude of the largest value found in each range cell with that of the largest remaining nonadjacent pulses of the range cell. If, when these two values are compared, a ratio greater than 2 is found to exist, the data in the range cell is considered to represent EMI. Conversely, if a ratio less than 2 is found to exist the data in the range cell is considered to represent a target.

The results of the EMI detector 68 produces a signal S8. Each range cell in the signal S8 produced by the EMI detector 68 is assigned a value of 1 unless EMI had been detect in the range cell. If this is the case, the range cell is assigned a value of 0. The signal S8 is then compare with the signal S6 in a manner consistent with conventional devices.

The radar system described herein differs greatly from conventional radar systems. A radar system used in accordance with the present invention produces a signal S7 which has been adaptively filtered to remove both low frequency and high frequency clutter components, without masking the EMI pulses which require detection. Specifically, the DFB 46, the CA CFAR devices 48 and the Inverse DFB 84 work in combination to adaptively filter clutter components received by the radar system, irrespective of frequency, while simultaneously passing EMI pulses for detection. As a result, in the signal S7 produced by the invention, the relative magnitude of the EMI pulses to the clutter echos is maximized and the EMI pulses can be optimally detected by the EMI detector 88. When this occurs, the number of false alarms contained in the signal S9 due to EMI decreases dramatically.

The present invention is not to be considered limited in scope by the preferred embodiments described in the specification. Additional advantages and modifications, which will readily occur to those skilled in the art from consideration of the specification and practice of the invention, are intended to be within the scope and spirit of the following claims.

I claim:

1. A radar system for identifying an object of interest, said radar system comprising:

a transmitter means for producing a first signal, where said first signal includes a plurality of pulses separated by a pulse repetition interval (PRI), where each PRI contains a plurality of range cells;

a duplexer means for receiving and processing signals, where said duplexer means receives said first signal from said transmitter;

an antenna, where said antenna receives said first signal from said duplexer means and transmits said first signal into the atmosphere, receives a second signal reflected by objects present in the atmosphere, and routes said second signal to said duplexer;

a receiving means for receiving said second signal from said duplexer, where said receiving means samples said second signal at all range cells, and develops a third signal;

a clutter filtering means for filtering a clutter component from said third signal at all frequencies and developing a fourth signal which is free from clutter;

an electromagnetic interference (EMI) detection means for identifying EMI present in said fourth signal and developing a fifth signal which is free from EMI;

a logic means for comparing said fourth and fifth signal to produce a sixth signal which is free from both clutter and EMI; and a display means for receiving and displaying said sixth signal.

2. A radar system for identifying an object of interest according to claim 1, wherein said EMI detection means further includes (i) an inverse Doppler filter bank and (ii) an EMI detector.

3. A radar system for identifying an object of interest according to claim 2, wherein said EMI detector comprises: (i) means for examining a plurality of contiguous values contained within each range cell of said fourth signal (ii) means for comparing the largest value found in each range cell to each remaining nonadjacent value in each range cell and calculating a factor, (iii) means for assigning each range cell a value, where said assigned value is 1 when said factor is less than 2 and said assigned value is 0 when said factor is greater than 2.

4. A radar system for identifying an object of interest according to claim 1, wherein said clutter filtering means further includes (i) a Doppler filter bank (ii) a plurality of cell averaging (CA) constant false alarm rates (CFAR) devices (iii) a plurality of threshold devices, and (iv) a logic gate.

5. A radar system for identifying an object of interest according to claim 4, wherein said Doppler filter bank comprises: (i) a first memory device, (ii) a Fourier transform device, and (iii) a second memory device.

6. A radar system for identifying an object of interest according to claim 4, wherein each of said plurality of CA CFAR devices comprises: (i) a moving window average calculator (MWAC) and (ii) a normalizer.

* * * * *